United States Patent [19] [11] 4,233,636
Harbaugh et al. [45] Nov. 11, 1980

[54] OPTICAL READ-WRITE SYSTEM WITH ELECTRONICALLY VARIABLE IMAGE SIZE

[75] Inventors: Steven K. Harbaugh, El Toro; Gary H. Hoogerbrugge, Placentia, both of Calif.

[73] Assignee: Eocom Corporation, Irvine, Calif.

[21] Appl. No.: 921,763

[22] Filed: Jul. 3, 1978

[51] Int. Cl.³ .............................................. H04N 1/02
[52] U.S. Cl. .................................................. 358/287
[58] Field of Search ................. 358/287, 77, 140, 180; 343/5 SC

[56] References Cited

U.S. PATENT DOCUMENTS

| 3,272,918 | 9/1966 | Koll et al. | 358/287 |
| 3,541,245 | 11/1970 | Wilby | 358/287 |
| 4,080,634 | 3/1978 | Schrieber | 358/287 |

Primary Examiner—Robert L. Griffin
Assistant Examiner—Joseph A. Orsino, Jr.
Attorney, Agent, or Firm—Flehr, Hohbach, Test

[57] ABSTRACT

Disclosed is an optical read-write system including a first laser scanner for linearly scanning an object and generating a digital signal for the line scan. The digital signal is stored in a buffer at a read clock rate which is correlated to the scan of the first laser scanner. The digital signal is read-out of the buffer at a write clock rate and is applied as a control signal for a second laser scanner which linearly scans an image plane to develop an image. The second scanner scans at the same scan rate and distance as the first scanner, and the size of the image compared to the object size is determined by the differential of the read clock rate and the write clock rate.

13 Claims, 6 Drawing Figures

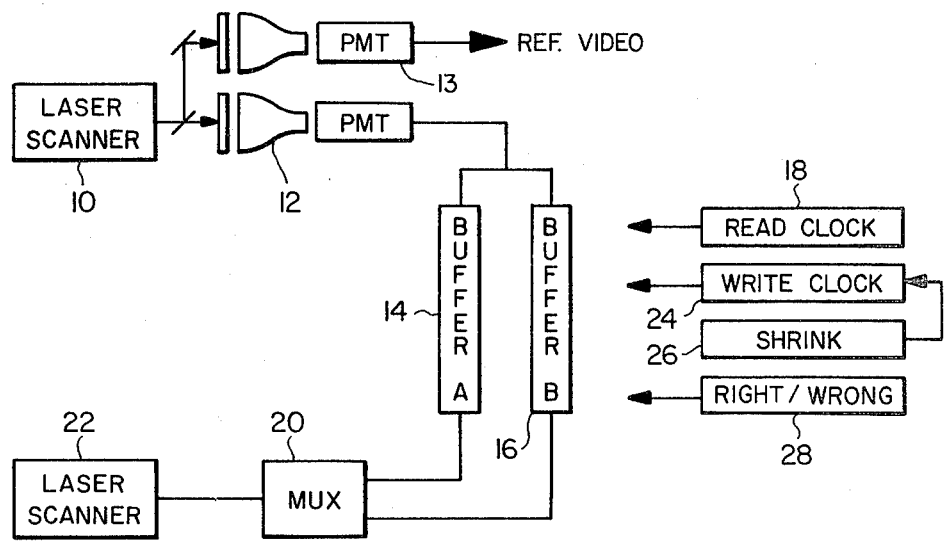
FIG_1
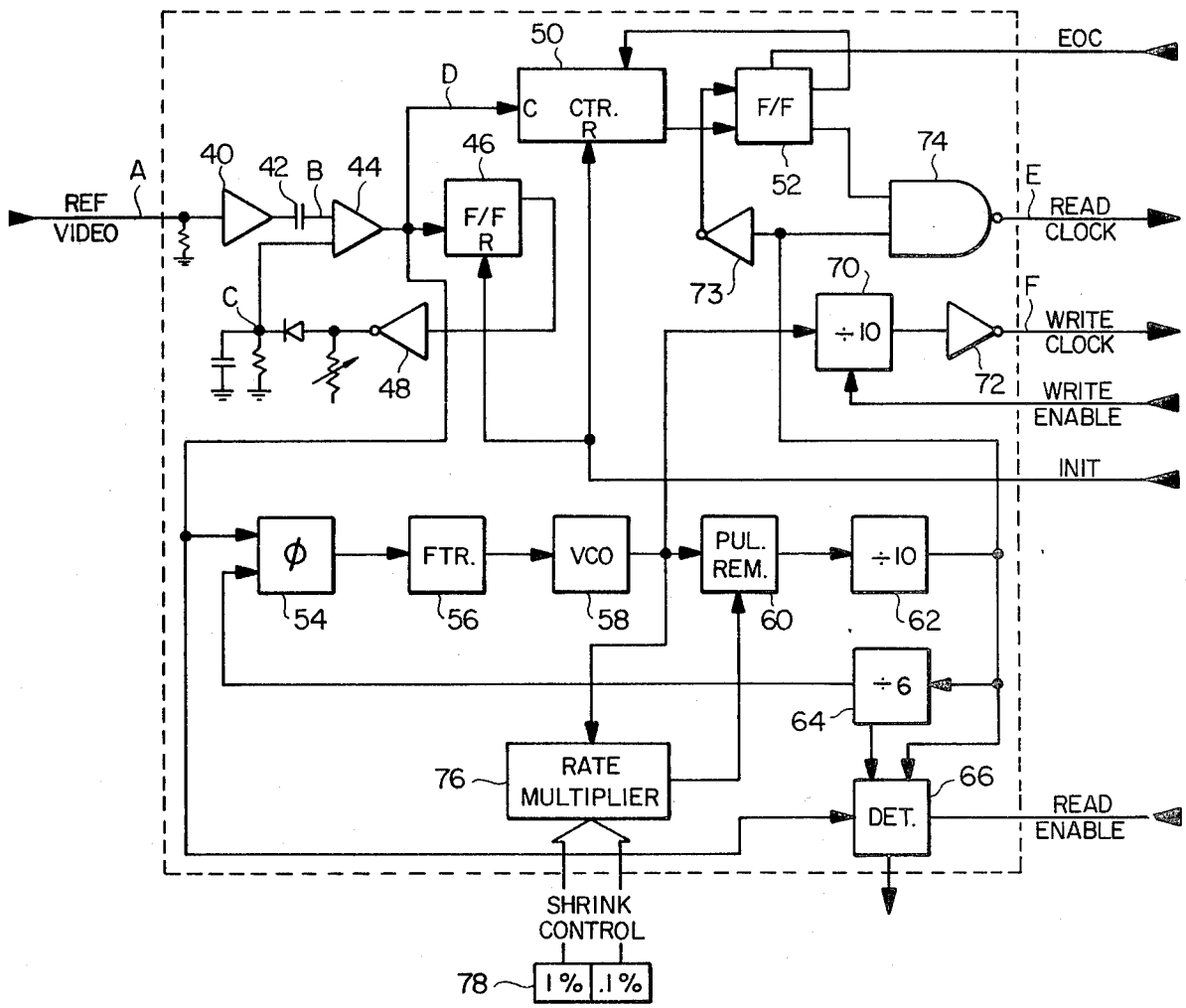
FIG_2

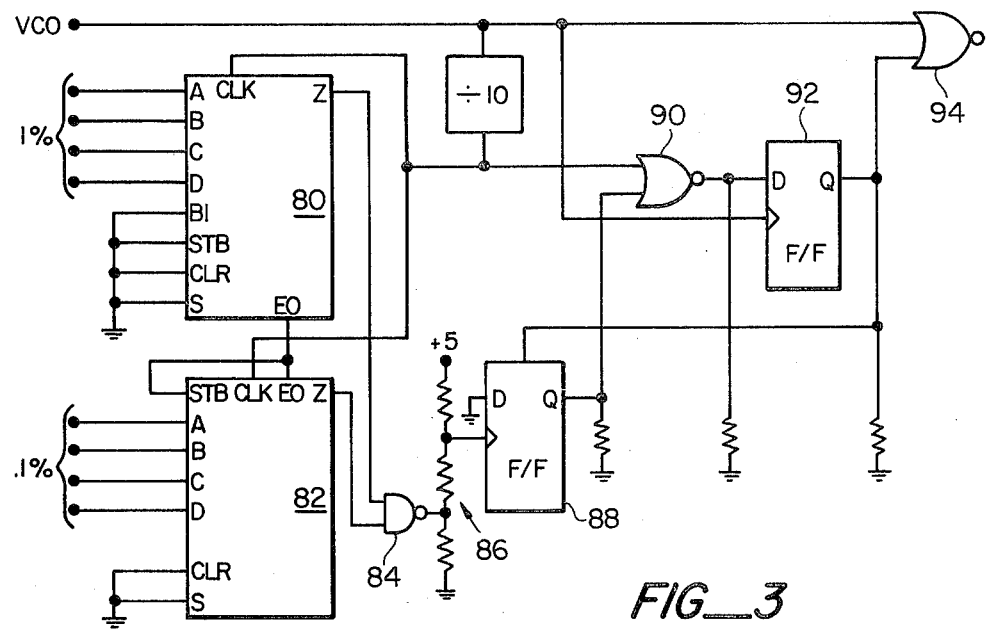
FIG_3
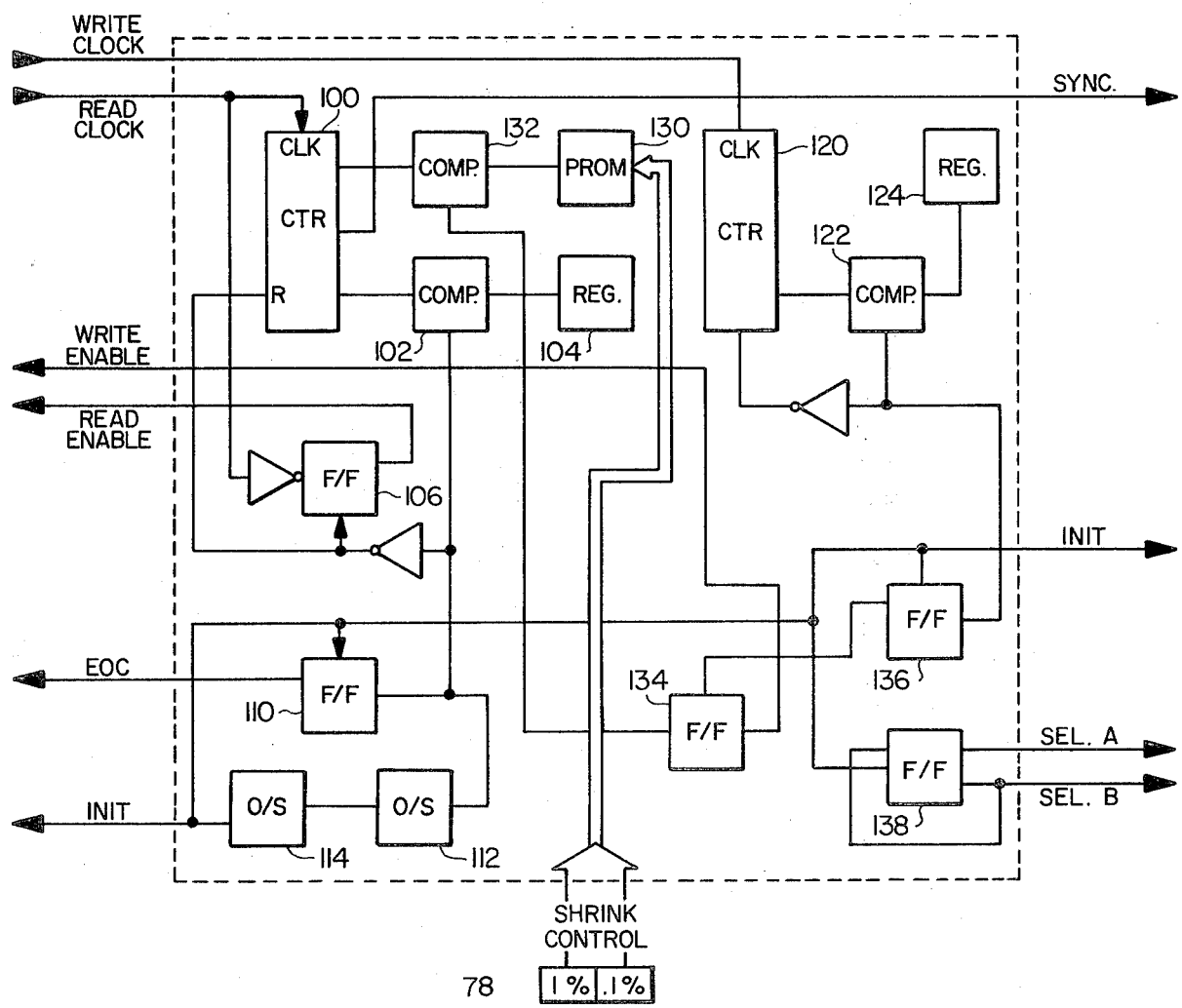
FIG_4

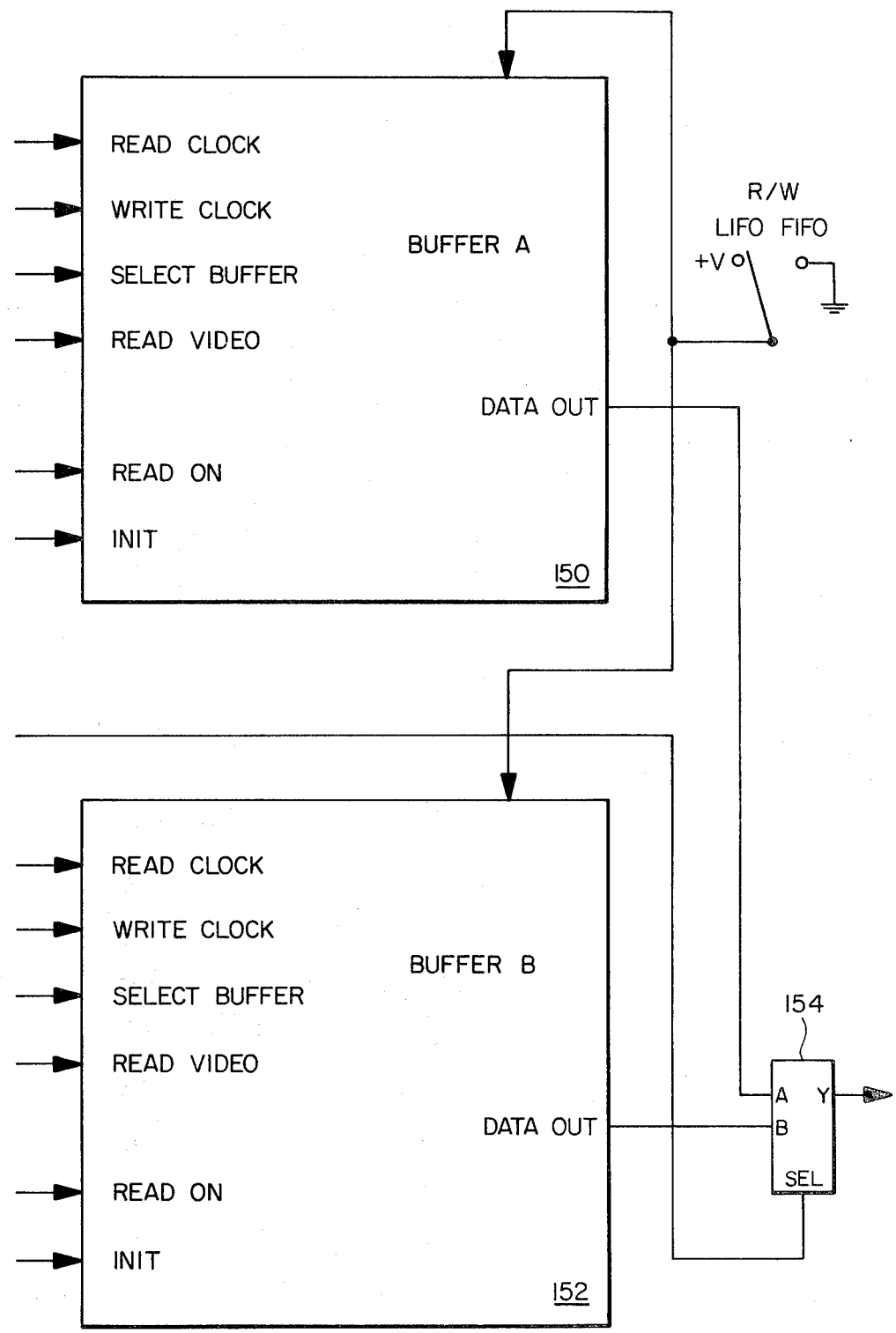
FIG__5

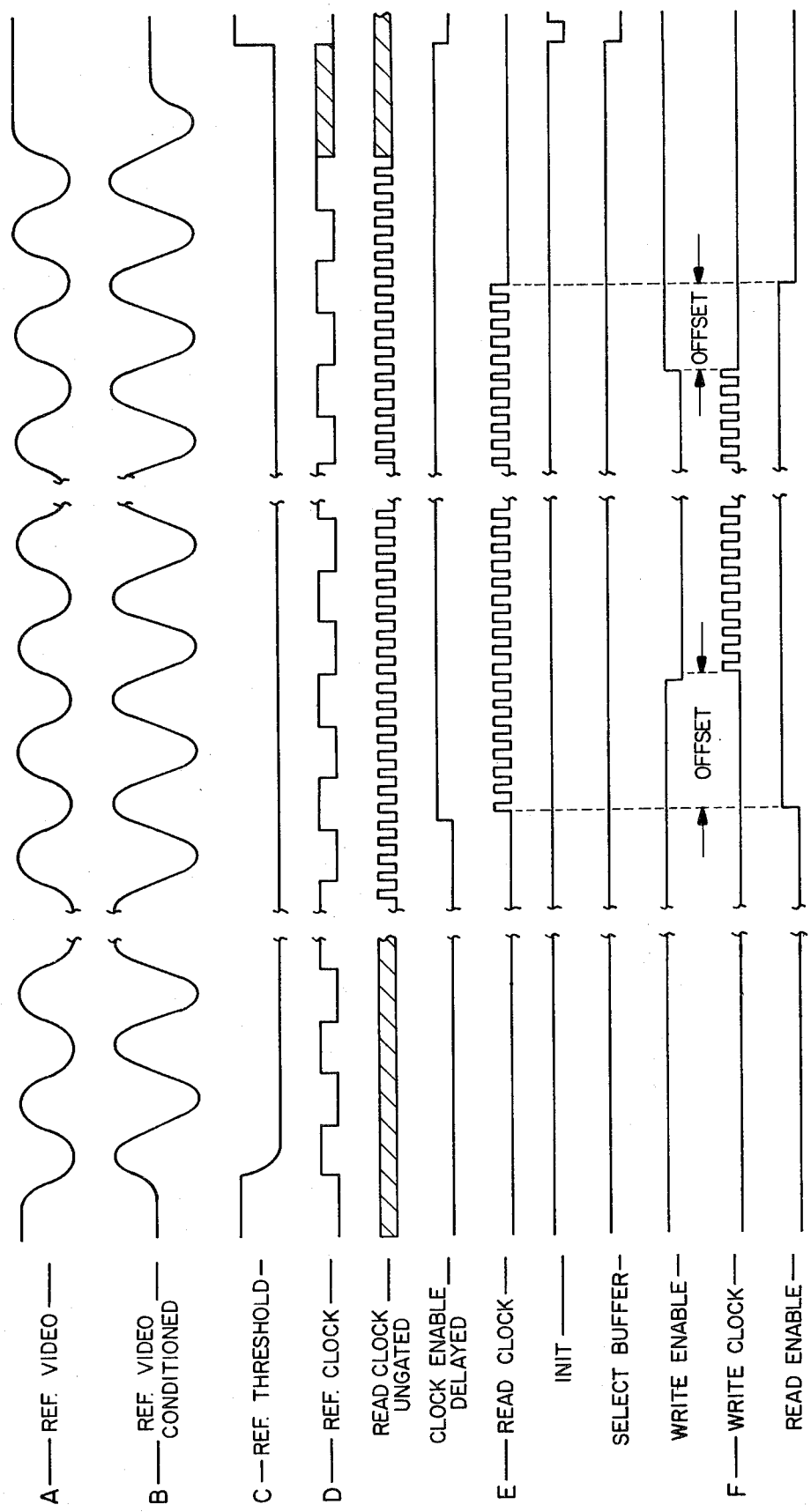

OPTICAL READ-WRITE SYSTEM WITH ELECTRONICALLY VARIABLE IMAGE SIZE

BACKGROUND OF THE INVENTION

1. Field of the Invention

This invention relates generally to optical systems for scanning an object and reproducing an image thereof, and more particularly the invention relates to a laser scanning system in which the size of a reproduced image may be electronically varied.

2. Prior Art

Various optical systems for scanning an object and reproducing an image thereof are known in the prior art. The Laserite system commercially available from EOCOM Corporation of Irvine, Calif. (assignee of this application) uses a laser scanner which develops an image signal by linearly scanning an object. The image signal controls a second laser scanner which develops the image of the object. The system has many applications including the setting of printing type, for example.

The optical system of the Laserite scanning system is disclosed in pending U.S. application Ser. No. 758,250 filed Jan. 10, 1977. In the described system the generated image signal is applied to a modulator which controls the beam intensity of the second laser which scans an image or output copy plane simultaneously as the first laser scans the object or input copy plane.

In pending application Ser. No. 695,921 filed June 14, 1976, now U.S. Pat. No. 4,081,842 another embodiment of the Laserite system is disclosed in which the image signal is applied to a photomultiplier tube which generates a video data signal. The video signal is applied through computer means to control the write laser scanner which develops the image or facsimile of the object. This system provides freedom from reliance on time synchronization which allows greater flexibility of operation.

In the prior art systems variations in size of the projected image have been accomplished optically by modifying lens focal lengths and linear scan distances. Such techniques are complex and require suitable lenses for substituting into the system.

SUMMARY OF THE INVENTION

An object of the present invention is an optical read-write system for scanning an object and reproducing an image which can be varied in size electronically.

Another object of the invention is a method of generating a video object signal and using the video signal to project an image which may differ in size from the object size.

A feature of the invention is means for generating a read clock signal and a write clock signal in which the write clock signal differs in frequency from the read clock signal to achieve a size differential between the object and image.

Briefly, the optical read-write system includes means for optically scanning an object and generating an electrical image signal. Means is provided for storing the electrical image signal at a read clock frequency and for retrieving the stored electrical image signal at a write clock frequency. The electrical image signal is then applied at the write clock frequency to a second scanning means which displays an image of the object.

In accordance with one embodiment of the invention the first scanning means and the second scanning means comprise laser devices, and the electrical image signal is generated by a photomultiplier tube. Both the read clock signal and the write clock signal can be derived from a reference signal generated by a photomultiplier tube through suitable electronic circuitry.

The invention and objects and features thereof will be more fully understood from the following detailed description and appended claims when taken with the drawing.

BRIEF DESCRIPTION OF THE DRAWING

FIG. 1 is a functional block diagram of an optical read-write system in accordance with the present invention.

FIG. 2 is a schematic diagram of a portion of one embodiment of read and write clock generating means in accordance with the present invention.

FIG. 3 is an electrical schematic of pulse removal circuitry used in the clock generating means of FIG. 2.

FIG. 4 is an electrical schematic of control circuitry operable with the read and write clock generator of FIG. 2.

FIG. 5 is an electrical schematic of data buffers and additional control circuitry for use with the read and write clock signal generator of FIGS. 2 and 3.

FIG. 6 is timing diagrams illustrating signals in and operation of the circuitry of FIGS. 2-4.

DETAILED DESCRIPTION OF THE PREFERRED EMBODIMENT

FIG. 1 is a functional block diagram of an optical read-write system in accordance with the present invention, and includes a first laser scanner 10 which scans an object and cooperatively functions with a photomultiplier tube 12 to develop a video image signal. The video image signal may comprise a plurality of ones and zeros representing, respectively, light and dark increments of the scanned object. In one embodiment the distance scanned by laser scanner 10 was 14 inches and the resolution of the video signal was 1 mil. Thus, 14,000 bits of information were necessary for one line scan video signal. A second photomultiplier tube is used with a reference mask (as disclosed in pending application Ser. No. 695,921, supra) and generates a reference video signal for synchronization of the image signal for later application in controlling a write laser scanner.

The video image signal for each line scan is applied alternately to a buffer A shown at 14 and a buffer B shown at 16 which are connected in parallel. Each buffer must include storage capacity for 14,000 bits so that the signal for one line scan can be stored. The read clock signal is derived from the reference signal, as will be described further hereinbelow, and is applied to the buffers whereby storage of the bits is in synchronization with the linear scan of laser scanner 10.

While the digital video information for one scan line of laser scan line 10 is being stored in buffer A, for example, the stored video signal from the previous line scan which is stored in buffer B is transferred through a multiplexer 20 to control a second laser scanner 22 which develops the image of the object scanned. As disclosed in application Ser. No. 695,951, supra, the first and second lasers may utilize the same scanning apparatus. Multiplexer 20 selects the proper buffer for readout as the other buffer is receiving data for storage.

Importantly, while data storage in each buffer is controlled by the signal from read clock 18, data retrieval from each buffer is controlled by a write clock 24, the frequency of which is controlled by the setting of a shrink encoder 26 whereby the frequency of the write clock signal is related to the frequency of the read clock signal in accordance with the desired percentage of image shrinkage. Also provided is a right/wrong control 28 which is interconnected with the buffers 14 and 16 whereby data may be read from each buffer either first in-first out (fifo) or last in-first out (lifo) to thereby develop either a read right or read wrong (mirror image) image, respectively.

In the preferred embodiment the laser scanners are of the type used in the Laserite optical scanning system and as disclosed in the above referenced pending patent applications. Each laser has a linear scan of 14 inches on either the object or image plane and both lasers have the same scanning rate. Therefore, if the video signal is generated by the laser scanner 10 at a read clock frequency, and the video signal is applied to control laser scanner 22 at a write clock frequency, shrinkage of the object may be obtained by writing the video signal at a faster frequency than is the read clock frequency. More particularly, for a 0.1% shrinkage of the image, the READ clock must have 999 pulses for every 1,000 pulses of the WRITE clock. Similarly, for a 10% shrinkage of the image, the READ clock will have 900 pulses for every 1,000 pulses of the WRITE clock. Thus, the number of pulses N, of pulses removed from every 1,000 WRITE clock pulses to develop a READ clock is $$N = \text{Shrinkage}(\%) \times 10$$

Referring now to FIGS. 2-5, one embodiment of the read clock, write clock, data buffers, and control circuitry is illustrated in schematic diagram. It will be appreciated that FIGS. 2, 4, and 5 are interconnected, but for description purposes each portion is shown separately. Further, the description of the schematics will be considered along with the waveforms illustrated in FIG. 5 of signals appearing within the circuitry.

FIG. 2 is the read/write clock generator portion which receives the analog reference video signal A (illustrated in FIG. 5) generated by the photomultiplier tube and which is applied through suitable conditioning circuitry to develop a digital reference clock signal D. The conditioning circuitry includes an amplifier 40 which receives the analog reference video signal A, and the amplified output signal is passed through capacitor 42 to provide a conditioned reference video signal B. The conditioned video signal B and a reference signal C are applied to comparator 44 with the output of comparator 44 applied as to the clock input of flip-flop 46. An initiate signal INIT is applied to the reset terminal of flip-flop 46 to synchronize operation of the circuitry.

The output from flip-flop 46 is applied through inverter 48 which reduces the reference signal C from approximately 0.6 volt to 0 volt upon the initiation of flip flop 46. A purpose of the referenced threshold voltage C is to prevent spurious signals from being generated by noise at the input of amplifier 40.

The digital reference clock signal D is taken at the output of comparator 44 and is applied at the clock input signal to counter 50 which cooperatively functions with flip-flop 52 to initialize a read clock output only after the first 32 cycles of the reference clock are counted. The 32 cycle delay allows for stabilization of the phase lock loop and reference threshold signal C and consequently the reference clock signal D.

The reference clock signal D is also applied as one input to phase detector 54 which is part of a phase lock loop including serially connected filter 56, voltage controlled oscillator 58, pulse remover 60, divider 62, and divider 64.

The output from divider 64 is applied back as the other input to phase detector 54. As is well known, in phase lock loop circuits the output frequency of a voltage controlled oscillator can be made proportional to an input signal by phase comparing the input signal with a reference signal derived from the output of the voltage controlled oscillator. Accordingly, phase comparator 54 will bias the voltage controlled oscillator 58 whereby the two inputs of phase detector 54 are equal frequencies. Thus, since phase detector 54 receives a reference signal equal to the controlled oscillator output divided by 60, the voltage controlled oscillator must be generating a frequency 60 times higher than the applied reference clock signal D, assuming that no pulses are removed by pulse remover 60. Detector 66 receives the reference clock signal D and the READ ENABLE and detects phase lock thereof.

In accordance with the present invention, the write clock signal is derived from the output of the voltage controlled oscillator 58, and the read clock signal is derived from the output of pulse remover 60. Thus, it will be appreciated that the write clock signal may have a slightly higher frequency than the read clock signal if pulses are removed from the VCO signal in deriving the read clock signal. The signal taken from the output of voltage controlled oscillator 58 is applied through a divider 70 and inverter 72 which generate the write clock signal F, or WRT CLK. The output of divider 62 is applied as one input to NAND gate 74, along with an output from flip-flop 52, with the output of NAND gate 74 being the read clock E, or READ CLK.

Operation of pulse remover 60 is controlled by a rate multiplier 76 which receives the output signal from voltage controlled oscillator 58 and a binary signal from a manually set shrink control 78. The rate multiplier responds to the binary code and selects pulses to be removed from the VCO signal. A control signal is applied to pulse remover 60 whenever a pulse is to be dropped by pulse remover 60. Thus, a desired frequency differential in the write clock and read clock, and consequently a desired shrinkage in the projected image of the optical read-write system, is effected.

FIG. 3 is an electrical schematic further illustrating the pulse removal circuitry used in the clock generating circuit of FIG. 2. The VCO output signal, which preferably is at a frequency sufficiently high to give 0.1 mil resolution, is divided by ten and applied as a clock input to rate multipliers 80 and 82. If a shrink setting has been entered via thumbwheel switches, a binary coded decimal number is applied to the rate multiplier inputs. The outputs of rate multipliers 80, 82 are applied to NAND gate 84 which produces positive going pulses at appropriate times in response to the shrink setting. These pulses are applied as a toggle input to flip-flop 88, causing its output to fall to a logic "0". The output of flip-flop 88 is then applied to one input of NOR gate 90, the other input to NOR gate 90 being derived from the divided VCO signal which is applied to rate multipliers 80, 82. When the two inputs are logic "0", NOR gate 90 produces a logic "1" which is transferred through flip-flop 92 to a pulse remover output gate 94, thereby inhibiting the output gate for one clock pulse duration.

Referring now to FIG. 4, the READ CLK and WRT CLK signals are applied to the control circuitry illustrated, and the WRITE ENABLE and READ ENABLE signals are derived therefrom along with an end of scan (EOC) signal and an initialize (INIT) signal. The read clock signal is applied to the input of binary counter 100 which upon application of a reset signal thereto begins a count of the read clock pulses. The accumulating count from counter 100 is applied to comparator 102 which compares the count to the total line bit count stored in register 104 to determine when a complete reading of one line scan of the read scanner is effected. A read enable circuit including flip-flop 106 receives the READ CLOCK signal as an input and generates a read enable signal. Flip-flop 106 is reset until comparator 102 indicates completion of one line scan. An end of scan signal (EOC) and an initiate signal (INIT) are derived from comparator 102 triggering flip-flop 110 to generate the end of scan signal and triggering one shot circuits 112 and 114 to generate the INIT signal. These signals are illustrated in FIG. 6.

In accordance with another aspect of the invention, an image which has been reduced in size is centered on the display medium by means of a programmable ROM 130 which has stored count corresponding to a desired percentage of shrinkage. The binary signal from shrink control 78 is applied to ROM 130 as an address and the count stored therein is applied to comparator 132 which compares this stored count, or offset, with the accumulating count of the read clock in counter 100. When the read clock reaches the desired offset received from PROM 130, a signal is applied to flip-flop 134 which generates a WRT ENABLE signal. Flip-flop 134 is set when the WRT CLK count in counter 120 reaches the total desired count stored in register 124, as determined by comparator 122. Comparator 122 then applies a clock signal flip-flop 136 which sets flip-flop 134.

The INIT signal from one shot 114 is applied also to flip-flop 136 as a set signal and to flip-flop 138 as an input at the beginning of each initialize cycle. Thus, the toggling of flip-flop 138 produces a buffer A select signal and a buffer B select signal.

Referring now to FIG. 5, the data buffers A and B are shown with inputs from circuitry of FIGS. 2 and 3 applied thereto with the output of the two buffers applies as inputs to multiplexer 154. Selection of the A channel or B channel of multiplexer 154 is determined by the select signal derived from flip-flop 138 of FIG. 4. Both buffer 150 and buffer 152 have input terminals to receive the READ CLK, WRT CLK, buffer select, READ VIDEO signal, READ ENABLE, and the initialize signal. In the embodiment previously described wherein the scanning means scans a linear length of 14 inches with resolution being 1 mil, each buffer must have a capacity to store 14,000 addressable bits of information. In one embodiment each of the data buffers includes 14 1k random access memories. Each buffer also has a line for receiving the R/W signal from an external manually set switch for addressing the buffer for reading stored data either first in-first out (fifo) or last in-first out (lifo) depending on whether a read-right or read-wrong image is desired. In one case the buffers are addressed serially from the first address to the last address for data readout, while in the other case the buffers are addressed in the reverse order from the highest address down to the initial address. Accordingly, the scanning means for developing the image will receive read-right image data or read-wrong image data.

An optical read-write system with electronically controlled variable image size offers improvements over the prior art system where image size is determined optically. While the invention has been described with reference to a specific embodiment, the description is illustrative and is not to be construed as limiting the invention. Various modifications and changes may occur to those skilled in the art without departing from the true spirit and scope of the invention as defined by the appended claims.

What is claimed is:

1. An optical read-write system for scanning an object and reproducing an image which may vary in size from said object comprising:

first laser means for linearly scanning an object at a scan rate and a photo multiplier tube for generating an electrical image signal for each scan, means for generating a read clock signal having a read frequency and generating a write clock signal having a write frequency, said means for generating a read clock signal and a write clock signal including a source of a reference signal, a phase comparator for receiving said reference signal and a feedback signal and producing a control voltage based on a comparison of said reference signal and said feedback signal, a voltage controlled oscillator having a control terminal, means connecting said control voltage from said phase comparator to said control terminal whereby said oscillator generates a pulse signal at a frequency dependent on said control voltage, pulse removal means connected to receive said oscillator signal and controllable to produce an output signal in which a variable number of pulses of said oscillator signal may be removed, frequency divider means connected to receive said output signal from said pulse removal means and produce a divider output signal at a frequency lower than said oscillator signal frequency, means for applying said divider output signal to said phase comparator as said feedback signal, said write clock signal being derived from said oscillator signal and said read clock signal being derived from said output signal produced by said pulse removal means, means for storing said electrical image signal at said read frequency in synchronization with the scan of said means for optically scanning, and second laser means for receiving said stored electrical image signal and linearly scanning at said scan rate for displaying an image at said write frequency.

2. An optical read-write system as defined by claim 1 wherein said read clock signal is generated for each scan of said first laser and said write clock signal is generated for each scan of said second laser, and including means for delaying the start of said write clock signal whereby said generated image is centered in the scan of said second laser.

3. An optical read-write system as defined by claim 1 and further including encoder means for generating a control signal for controlling said pulse removal means whereby a number of pulses are removed from said oscillator signal for a desired percentage of shrinkage in size of said image.

4. An optical read-write system as defined by claim 3 wherein said pulse removal means removes N pulses from every 1,000 pulses of said oscillator signal where N=10 (shrink percentage).

5. An optical read-write system for scanning an object and reproducing an image which may vary in size from said object comprising:
- first means for optically scanning an object and generating an electrical image signal for each scan,
- means for generating a read clock signal having a read frequency and generating a write clock signal having a write frequency, said means for generating a read clock signal and a write clock signal including
  - a source of a reference signal,
  - a phase comparator for receiving said reference signal and a feedback signal and producing a control voltage based on a comparison of said reference signal and said feedback signal,
  - a voltage controlled oscillator having a control terminal, means connecting said control voltage from said phase comparator to said control terminal whereby said oscillator generates a signal at a frequency dependent on said control voltage,
  - pulse removal means connected to receive said oscillator signal and controllable to produce an output signal in which a variable number of pulses of said oscillator signal may be removed,
  - frequency divider means connected to receive said output signal from said pulse removal means and produce a divider output signal at a frequency lower than said oscillator signal frequency,
  - means for applying said divider output signal to said phase comparator as said feedback signal,
  - said write clock signal being derived from said oscillator signal and said read clock signal being derived from said output signal produced by said pulse removal means,
- means for storing said electrical image signal at said read frequency in synchronization with the scan of said means for optically scanning, and
- scanning means for receiving said stored electrical image signal and displaying an image at said write frequency.

6. An optical read-write system as defined by claim 5 and further including encoder means for generating a control signal for controlling said pulse removal means whereby a number of pulses are removed from said oscillator signal for a desired percentage of shrinkage in size of said image.

7. An optical read-write system as defined by claim 6 wherein said pulse removal means removes N pulses from every 1,000 pulses of said oscillator signal where N=10 (shrink percentage).

8. An optical read-write system as defined by claim 5 wherein said means for storing said electrical image signal comprises first and second random access memories operably connected whereby one of said random access memories can receive a signal for storage while the other one of said random access memories is providing a signal to said means for displaying an image.

9. An optical read-write system as defined by claim 8 wherein said means for storing further includes multiplexer means connected to said first and second random access memories for alternately providing a signal from each of said random access memories to said means for displaying an image.

10. An optical read-write system as defined by claim 8 and further including a random access memory address means whereby a stored signal can be read out serially in a forward direction and serially in a reverse direction whereby said means for displaying an image can generate read-right and read-wrong images of said object.

11. An optical read-write system as defined by claim 8 wherein said means for optically scanning an object scans a linear distance of D mils and has a resolution of 1 mil, and said first and second random access memories each has a storage capacity of at least D bits.

12. An optical read-write system as defined by claim 11 wherein said means for optically scanning comprises a first laser which linearly scans at a fixed scanning rate and said means for generating an electrical image signal comprises a photomultiplier tube.

13. An optical read-write system as defined by claim 12 wherein said means for receiving said stored signal comprises a second laser which linearly scans simultaneously as said first laser scans at a scanning rate equal to the scanning rate of said first laser.

* * * * *